United States Patent [19]
Kobayashi et al.

[11] Patent Number: 5,581,403
[45] Date of Patent: Dec. 3, 1996

[54] BEAM SHAPING AND BEAM SPLITTING DEVICE AND OPTICAL HEAD COMPRISING THE SAME

[75] Inventors: Shohei Kobayashi, Hachioji; Yasuhiro Miyazaki, Akigawa, both of Japan

[73] Assignee: Olympus Optical Co., Ltd., Tokyo, Japan

[21] Appl. No.: 130,529

[22] Filed: Oct. 1, 1993

[30] Foreign Application Priority Data

Oct. 1, 1992 [JP] Japan ..................... 4-263730
May 27, 1993 [JP] Japan ..................... 5-125941

[51] Int. Cl.$^6$ ............... G02B 5/30; G02B 27/28
[52] U.S. Cl. ............... 359/496; 359/495; 365/215; 369/44.23
[58] Field of Search ............... 359/494, 495, 359/496, 497; 369/44.23, 110; 365/215

[56] References Cited

U.S. PATENT DOCUMENTS

| | | | |
|---|---|---|---|
| 4,719,614 | 1/1988 | Leterme et al. | 369/110 |
| 5,004,321 | 4/1991 | Feldman et al. | 359/362 |
| 5,078,482 | 1/1992 | Feldman et al. | 359/371 |
| 5,272,685 | 12/1993 | Ando | 369/44.23 |
| 5,289,313 | 2/1994 | Matsuoka | 359/496 |
| 5,291,571 | 3/1994 | Kunikane et al. | 359/496 |
| 5,293,569 | 3/1994 | Koyama | 369/44.23 |

FOREIGN PATENT DOCUMENTS

| | | | |
|---|---|---|---|
| 59-48716 | 3/1984 | Japan | 359/496 |
| 61-292232 | 12/1986 | Japan | 359/496 |
| 62-98320 | 5/1987 | Japan | 359/496 |
| 62-141653 | 6/1987 | Japan . | |
| 63-56823 | 3/1988 | Japan | 369/110 |
| 63-187442 | 8/1988 | Japan . | |
| 63-293519 | 11/1988 | Japan | 359/496 |
| 2-12620 | 1/1990 | Japan | 369/110 |
| 321973B2 | 3/1991 | Japan . | |
| 3-88155 | 4/1991 | Japan | 369/110 |
| 4-301245 | 10/1992 | Japan | 369/110 |
| 5-210005 | 8/1993 | Japan | 359/496 |
| 6-139647 | 5/1994 | Japan | 369/110 |
| 6-168478 | 6/1994 | Japan | 369/110 |

*Primary Examiner*—Paul M. Dzierzynski
*Assistant Examiner*—Darren E. Schuberg
*Attorney, Agent, or Firm*—Watson Cole Stevens Davis, P.L.L.C.

[57] ABSTRACT

A beam shaping and beam splitting device for converting a cross sectional shape of a polarized parallel incident light beam into a light beam having a corrected cross sectional shape, emanating the light beam toward a reflection surface and emanating a return light beam reflected by said reflection surface in a direction which is different from an incident direction of said incident light beam, including a prism made of an anisotropic material and having a first surface upon which said incident light beam is made incident from an incident direction which is inclined with respect to said first surface and a second surface from which the incident light beam emanates from the prism, in which said return light beam is refracted by said first surface and emanates from the first surface in a direction which is different from said incident direction. A separation angle between the incident light beam direction and the emanating direction of the return beam is mainly determined by a difference in the refractive indices of the prism for ordinary and extraordinary rays and can be made very small. In an optical head including such a beam shaping and beam splitting device, the light source and photodetector can be arranged nearer to each other, so that the optical head can be made small in size.

27 Claims, 3 Drawing Sheets

FIG_1
PRIOR ART

FIG_2

FIG_3

FIG_4

FIG_5

FIG_6

FIG_7

BEAM SHAPING AND BEAM SPLITTING DEVICE AND OPTICAL HEAD COMPRISING THE SAME

BACKGROUND OF THE INVENTION

1. Field of the Invention

The present invention relates to a beam shaping and beam splitting device for converting a cross sectional shape of an incident light beam and splitting a return light beam from the incident light beam, said return light beam being obtained after reflecting the light beam by a reflection surface. The present invention also relates to an optical head comprising a beam shaping and beam splitting device for use in an information recording and/or reproducing apparatus.

2. Description of the Related Art

There has been proposed a technique for effecting both beam shaping and beam splitting. For instance, Japanese Patent Publication No. 3-21973 discloses an optical head for use in an optical disk recording and/or reproducing apparatus comprising a laser light source, in which a single prism is used for correcting an elliptical cross section of an incident laser light beam into a circular cross section as well as for splitting a return laser beam reflected by an optical disk from the incident laser light beam.

Figure 1:
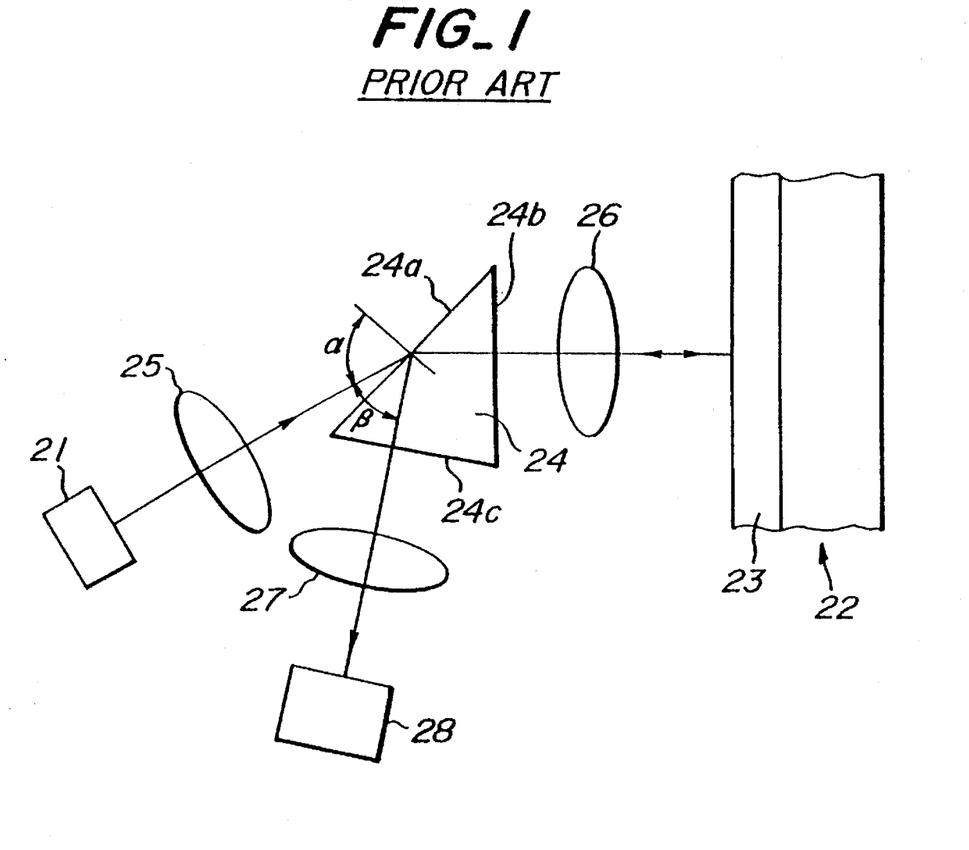
FIG. 1 is a schematic view showing a known optical head comprising the beam shaping and beam splitting prism.

FIG. 1 is a schematic view showing the above mentioned known optical head. In this optical head, between a semiconductor laser 21 and a record medium 23 of an optical disk 22, there is arranged a prism 24, and between the semiconductor laser 21 and the prism 24 there is arranged a collimator lens 25. An objective lens 26 is arranged between the prism 24 and the record medium layer 23.

The prism 24 has a special coating on its incident surface 24a for splitting the incident laser beam from the return laser beam from each other. Further, the incident surface 24a is arranged with respect to the incident laser beam such that an elliptical cross sectional shape of the incident laser beam emitted from the semiconductor laser 21 and being incident upon the prism 24 is converted into a circular cross sectional shape. The laser beam propagates within the prism 24 and emanates from a second surface 24b of the prism 24 perpendicularly thereto. Then the laser beam is projected onto the optical disk 22 by means of the objective lens 26 and is reflected by the optical disk. In the specification of the present application, this laser beam is called a return laser beam. Then, the return laser beam is made incident upon the second surface 24b of the prism 24 and propagates within the prism toward the first surface 24a. The return laser beam is reflected by the coating on the first surface 24a toward a third surface 24c and emanates from the third surface 24c perpendicularly thereto. That is to say, the return laser beam can be split from the incident laser beam.

The laser beam emanating from the prism 24 through the third surface 24c is received by a light receiving element 28 by means of a lens 27. The lens 27 and light receiving element 28 constitute a photodetecting system for receiving the return laser beam reflected by the record medium layer 23 of the optical disk 22.

The laser beam emitted by the semiconductor laser 21 generally has an elliptical cross sectional shape. This laser beam is made incident upon the incident surface 24a of the prism 24 via the collimator lens 25 at such an incident angle $\alpha$ that the elliptical cross sectional shape of the incident laser beam is converted into a circular cross sectional shape. Then, the laser beam emanates from the prism 24 via the second surface 24b and is made incident upon the record medium layer 23 of the optical disk 22 by means of the objective lens 26.

The return laser beam reflected by the record medium layer 23 of the optical disk 22 is made incident upon the second surface 24b of the prism 24 by means of the objective lens 26. Within the prism 24, the return laser beam is reflected by the special coating applied on the surface 24a and emanates from the prism via the third surface 24c. The laser beam is finally made incident upon the photodetector 28 by means of the lens 27. In the manner explained above, the prism 24 serves as the beam shaper as well as the beam splitter.

The known optical head explained above has an advantage that the beam shaping means and beam splitting means are constituted by the single prism, so that the number of parts of the optical head can be reduced and thus the optical head can be made small in size. However, a beam separation angle $\beta$ between the incident laser beam and the return laser beam is relatively large. This is due to the fact that the incident angle $\alpha$ of the incident laser beam with respect to the first surface 24a has to be set to achieve a desired beam shaping and the laser beam reflected by the record medium layer 23 of the optical disk 22 has to be reflected by the first surface 24a. Therefore, the laser light source 21 and photodetector 28 have to be arranged to be separated from each other, and therefore the optical head could not be made sufficiently small.

SUMMARY OF THE INVENTION

The present invention has for its object to provide a novel and useful beam shaping and beam splitting prism, in which an angle between an incident beam and an exiting beam can be made small.

The present invention also relates to an optical head comprising a beam shaping and beam splitting prism, in which a light source and a photodetector can be arranged much closer to each other, so that the optical head can be made small in size.

According to the invention, a beam shaping and beam splitting device for correcting a cross sectional shape of a polarized incident light beam, and emanating a return light beam which is obtained by reflecting the light beam by a reflection surface in a direction which is different from an incident direction of said incident light, comprises:

a prism made of an anisotropic material and having a first surface upon which said incident light beam is made incident from an incident direction which is inclined with respect to said first surface and a second surface from which the incident light beam emanates from the prism, said return light beam being refracted by said first surface and emanating from the first surface in a direction which is different from said incident direction.

In Japanese Patent Application Laid-open Publication Kokai Sho No. 62-141653, there is described a prism made of an anisotropic material having a double refraction. However, this prism is arranged in a diverging light beam, so that the prism could never function to change or convert the cross sectional shape of the light beam. Further, in the known prism, in order to obtain a large separation angle between the incident light beam and the exit light beam, it is necessary to use material having a large double refraction such as a calcite. In other words, if the known prism is made of generally available double refraction material such as rock crystal, a large separation angle could not be obtained.

According to the invention, the prism made of anisotropic material serves to convert the cross sectional shape of the incident light beam as well as to split the return light beam from the incident light beam. That is to say, the incident surface of the prism is arranged such that the elliptical cross sectional shape of the incident laser beam emitted by the semiconductor laser is converted into a circular cross sectional shape. The polarizing condition of the polarized incident laser beam includes a polarized light component which is different from a polarized light component contained in the return light beam which has been reflected by the reflection surface and is made incident again upon the prism, so that a refractive index of the prism for the polarized light component of the incident laser beam differs from that of the return laser beam. Therefore, the return laser beam is refracted by the first surface of the prism in a direction which is different from the incident direction in which the laser beam emitted by the semiconductor laser is made incident upon the prism. According to the invention, the separation angle between the incident light beam and the return light beam is mainly determined by a very small difference in the refractive index of the prism for the incident light beam and return light beam, and therefore the separation angle can be made very small.

According to the invention, an optical head for use in an optical information recording and/or reproducing apparatus comprises:

a light source means for emitting a polarized parallel light beam;

a prism made of anisotropic material and having a first surface upon which said parallel light beam emitted by said light source means is made incident in such an incident direction that a cross sectional shape of the incident light beam is corrected, and a second surface from which said light beam having the corrected cross sectional shape emanates;

an objective lens for projecting said light beam emanating from said second surface of the prism onto a reflective optical record medium and making a return light beam reflected by said optical record medium incident upon said second surface of the prism; and a photodetector for receiving said return light beam refracted by said first surface of the prism into a direction which is different from said incident direction.

In the optical head according to the invention, the return light beam is separated from the incident light beam by a very small separation angle which is mainly determined by a difference in a refractive index of the prism for the incident light beam and the return light beam, and therefore the light source and photodetector can be arranged close to each other so that the optical head can be made small in size.

DESCRIPTION OF THE PREFERRED EMBODIMENTS

Figure 2:
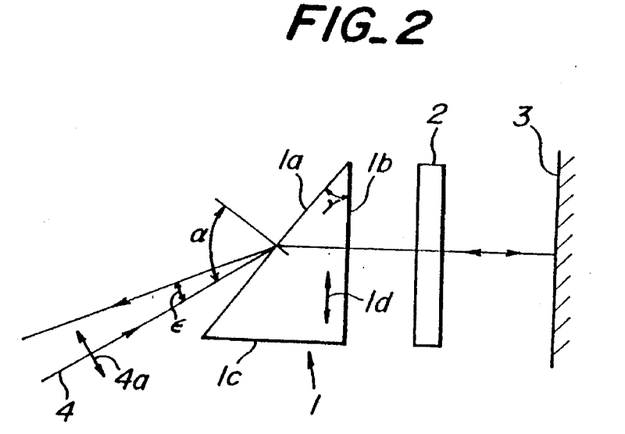
FIG. 2 is a schematic view illustrating a first embodiment of the beam shaping and beam splitting device according to the invention.

FIG. 2 is a schematic view showing a first embodiment of the beam shaping and beam splitting device according to the invention. A reference numeral 1 denotes a prism formed as a single body. According to the invention, the prism 1 is made of an optically anisotropic material, and in the present embodiment the prism is made of a uniaxial crystal, e.g. rock crystal. When a light beam is made incident upon the uniaxial crystal, the light beam propagates as ordinary ray and extraordinary ray which are independent from each other.

In the present embodiment, the prism 1 is formed as a triangular prism having first, second and third surfaces $1a$, $1b$ and $1c$. A reference numeral $1d$ denotes an optic axis of the rock crystal. An incident light beam 4 is made incident upon the prism 1 via the first surface $1a$ at such an incident angle $\alpha$ that an elliptical cross sectional shape of the incident light beam is converted into a circular cross sectional shape. An apex angle $\gamma$ between the first and second surfaces $1a$ and $1b$ is determined such that the incident light beam 4 is refracted by the first surface $1a$ and exits from the second surface $1b$ perpendicularly thereto. Further, the prism 1 is formed such that the optic axis $1d$ is parallel with a plane of the drawing of FIG. 2. That is, the optic axis $1d$ of the prism 1 is in an incident plane of the linearly polarized light beam 4.

The light beam emanating from the second surface $1b$ of the prism 1 is made incident upon a reflection surface 3 via a quarter wavelength plate 2. The light beam reflected by the reflection surface 3 is made incident upon the second surface $1b$ of the prism 1 via the quarter wavelength plate 2 as a return light beam. Therefore, the return light beam has passed through the quarter wavelength plate 2 twice, so that its polarizing direction has been changed or rotated by 90 degrees.

In the present embodiment, the incident light beam 4 impinging upon the first surface $1a$ of the prism 1 is linearly polarized. In FIG. 2, the polarizing direction is denoted by a reference numeral $4a$. The polarizing direction $4a$ of the linearly polarized incident light beam 4 is determined in relation to the direction of the optic axis $1d$ of the prism 1 such that the incident light beam 4 propagates within the prism as an ordinary ray or extraordinary ray.

In the present embodiment, the linearly polarized light beam 4 is made incident upon the first surface $1a$ of the prism 1 such that the polarizing direction $4a$ is parallel with the plane of the drawing of FIG. 2. Therefore, both the polarizing direction $4a$ of the incident light beam 4 and the optic axis $1d$ of the prism 1 are parallel with the plane of the drawing of FIG. 2, so that the incident light beam propagates within the prism as the extraordinary ray.

Now the operation of the beam shaping and beam splitting device of the present embodiment will be explained. As stated above, the incident light beam 4 is made incident upon the first surface $1a$ of the prism 1 at such an incident angle $\alpha$ that the elliptical cross sectional shape of the incident light beam 4 is converted into a circular cross sectional shape.

Then, the incident light beam 4 is refracted by the first surface 1a. In this case, the incident light beam 4 propagates within the prism 1 as the extraordinary ray, because the polarizing direction 4a of the incident light beam 4 and the optic axis 1d of the prism 1 are parallel with the plane of the drawing of FIG. 2. Then, the light beam exits from the second surface as the light beam whose cross sectional shape has been circularly converted and which is polarized linearly in a polarizing direction which is parallel with the plane of the drawing of FIG. 2.

The linearly polarized light beam is converted by the quarter wavelength plate 2 into a circularly polarized beam, and the thus circularly polarized light beam is made incident upon the reflection surface 3. Then, the light beam is reflected thereby and is made incident again upon the prism 1 via the quarter wavelength plate 2. In the present specification, this light beam is called a return light beam. A rotational direction of the circularly polarized light beam is reversed by the reflection by the reflection surface 3 and passes again through the quarter wavelength plate 2. Therefore, the circularly polarized light beam is converted into the linearly polarized light beam, but a polarizing direction of the thus converted return light beam is also reversed and is perpendicular to the plane of the drawing of FIG. 2.

The return light beam is then made incident upon the prism 1 via the second surface 1b. Within the prism 1, the return light beam propagates as the ordinary ray, because its polarizing direction is perpendicular to the optic axis 1d of the prism 1 made of the uniaxial crystal. The return light beam is then refracted by the first surface 1a and emanates from the prism 1. A refractive index of the prism 1 for the ordinary ray is different from that for the extraordinary light, so that the return light beam emanates from the prism 1 in a direction which is slightly different from a direction in which the incident light beam 4 is made incident upon the prism. That is to say, a separation angle e between the incident light beam and the return light beam is very small. Therefore, when the beam shaping and beam splitting device is applied to the optical head, the light source emitting the incident light beam 4 can be arranged near the photodetector for receiving the return light beam, and thus the optical head can be made small in size.

In the above embodiment, the polarizing direction 4a of the incident light beam 4 and the optic axis 1d of the prism 1 made of the uniaxial crystal are made in parallel with the plane of the drawing of FIG. 2. In a modified embodiment, the optic axis of the prism may be perpendicular to the plane of the drawing of FIG. 2, i.e., the incident plane of the incident light beam. In this case, the incident light beam propagates within the prism 1 as the ordinary ray, and the return light beam reflected by the reflection surface 3 propagates as the extraordinary ray. Further, according to the invention, the prism may be arranged such that the optic axis of the prism is neither parallel with nor perpendicular to the plane of the drawing of FIG. 2. Also in this case, the linearly polarized incident light beam has to be made incident upon the prism such that the polarizing direction of the incident light beam is made parallel with or perpendicular to the optic axis of the prism.

Furthermore, in the above explained first embodiment, the quarter wavelength plate 2 is provided between the prism 1 and the reflection surface 3, but according to the invention any optical element for changing the polarized condition of the light beam may be used instead of the quarter wavelength plate. For instance, a Faraday rotator may be arranged between the prism and the reflection surface. According to the invention, this optical element serves to rotate the polarizing direction by 45 degrees, and the light beam passes through the optical element twice, so that the polarizing direction of the return light beam is rotated by 90 degrees with respect to the incident light beam. Therefore, when the incident light beam propagates within the prism as the ordinary or extraordinary ray, the return light beam propagates as the extraordinary or ordinary ray, and thus the return light beam exits from the first surface of the prism in the direction which is slightly different from the direction in which the incident light beam is made incident upon the prism.

Figure 3:
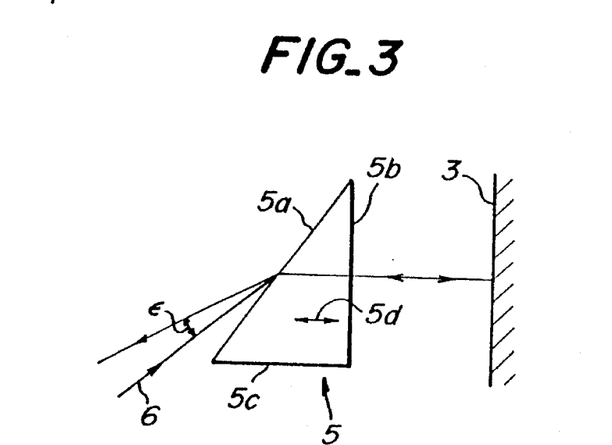
FIG. 3 is a schematic view depicting a second embodiment of the beam shaping and beam splitting device according to the invention.

FIG. 3 is a schematic view showing a second embodiment of the beam shaping and beam splitting device according to the invention. In this embodiment, a prism 5 is made of an optically anisotropic crystal such as a rock crystal which is a kind of quartz and reveals the natural rotary polarization. Also in the present embodiment, the prism 5 is formed in the shape of a triangular prism having first, second and third surfaces 5a, 5b and 5c, and its optic axis is denoted by a reference numeral 5d. Within the rock crystal, the light beam propagating in the direction of the optic axis 5d becomes a right-handed circularly polarized light beam or a left-handed circularly polarized light beam. In the present embodiment, a right-handed elliptically polarized light beam 6 is made incident upon the first surface 5a of the prism 5. The incident light beam is refracted by the first surface 5a and then emanates from the second surface 5b of the prism in a direction which is perpendicular to the second surface 5b.

Now the operation of the present embodiment will be explained. The right-handed elliptically polarized light beam 6 is made incident upon the first surface 5a of the prism 5 from such an incident direction that the elliptical cross sectional shape of the incident light beam is converted into a circular cross sectional shape and the right-handed elliptically polarized light beam is converted into a right-handed circularly polarized light beam. That is to say, the elliptic ratio of the elliptically polarized light beam is determined such that when the elliptically polarized light beam is made incident upon the first surface 5a at a given incident angle, the elliptically polarized light beam is converted into the circularly polarized light beam. The right-handed circularly polarized light beam emanates from the second surface perpendicularly thereto and is made incident upon the reflection surface 3 perpendicularly thereto. In the present embodiment, the quarter wavelength plate is not provided between the prism 5 and the reflection surface 3. The right-handed circularly polarized light beam is reflected by the reflection surface 3, and thus the rotating direction of the circularly polarized light beam is reversed. That is to say, the return light beam becomes a left-handed circularly polarized light beam.

The left-handed circularly polarized light beam is made perpendicularly incident upon the second surface 5b of the prism 5 and propagates within the prism as the left-handed circularly polarized light. The left-handed circularly polarized light beam emanates from the first surface 5a and is refracted thereby. A refractive index of the rock crystal prism 5 for the right-handed circularly polarized light is slightly different from that for the left-handed circularly polarized light, and therefore the return light beam emanates from the prism 5 in a direction which is different from a direction in which the incident light beam 6 is made incident upon the first surface 5a. In this manner, the return light beam is separated from the incident light beam 6 by a small separation angle ε.

In the second embodiment, the prism 5 is made of optically anisotropic material, and the polarizing condition of the incident light beam is different from the polarizing condition of the return light beam, and thus these light beams are separated from each other by the very small separation angle $\epsilon$. In the second embodiment, the optical element for changing the polarized condition of the light beam, i.e., the quarter wavelength plate or Faraday rotator, can be dispensed with.

Figure 4:
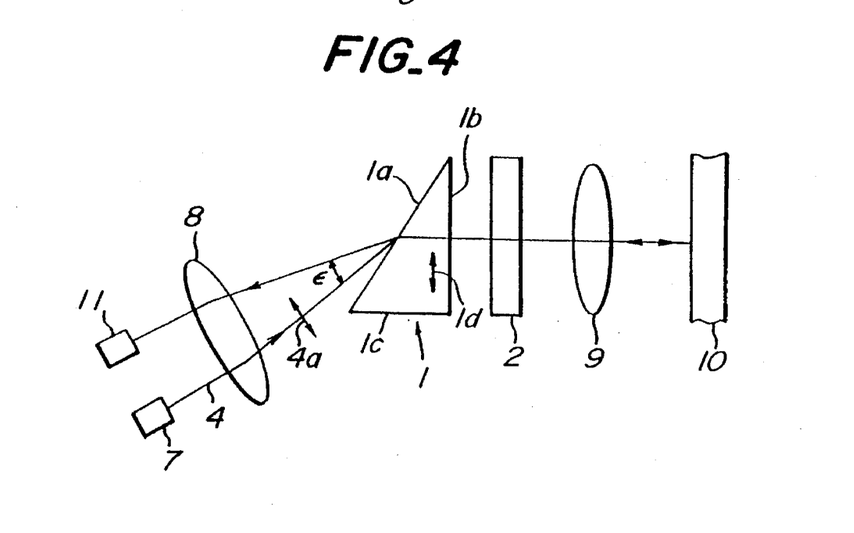
FIG. 4 is a schematic view representing a first embodiment of the optical head according to the invention.

FIG. 4 is a schematic view depicting a first embodiment of the optical head comprising the beam shaping and beam separating device according to the invention. The prism 1 and quarter wavelength plate 2 constitute the beam shaping and beam splitting device shown in FIG. 2. In the present embodiment, a linearly polarized laser light beam emitted by a semiconductor laser 7 is first converted into a parallel laser beam by means of a collimator lens 8, and then the thus converted laser beam is made incident upon the first surface 1a of the prism 1 as the incident light beam 4. The incident laser beam 4 is linearly polarized in the polarizing direction which is parallel with the plane of the drawing of FIG. 4. The laser beam emanating from the second surface 1b of the prism 1 is projected onto an optical record medium 10 such as optical disk or an optical card via the quarter wavelength plate 2 and an objective lens 9. Further, the return laser beam reflected by the optical record medium 10 is made incident upon the second surface 1b of the prism 1 and is refracted by the first surface 1a in a direction which differs from the direction in which the laser beam is made incident upon the prism by a small separation angle $\epsilon$, and is then made incident upon a photodetector 11 by means of the collimator lens 8.

In the present embodiment, the light source means for emitting a polarized parallel light beam comprises the semiconductor laser 7 and collimator lens 8. The polarized parallel laser beam is made incident upon the first surface 1a of the prism 1 in such a direction that the elliptical cross section of the incident laser beam 4 is converted into the circular cross section. The incident laser beam is polarized in the direction 4a which is parallel with the plane of the drawing of FIG. 4, and the optic axis 1d of the prism 1 is also parallel with the plane of the drawing of FIG. 4, and thus the incident laser beam propagates within the prism 1 as the extraordinary ray. The laser beam exits the second surface 1b of the prism 1 and is then made incident upon the optical record medium 10 by means of the quarter wavelength plate 2 and objective lens 9 as a very fine spot. The laser beam is then reflected by the optical record medium 10 and is made incident upon the quarter wavelength plate 2 as the return laser beam, so that the polarizing direction of the polarized return laser beam emanating from the quarter wavelength plate 2 has been rotated by 90 degrees with respect to the incident laser beam 4. The return laser beam is then made incident upon the second surface 1b of the prism 1 and propagates within the prism 1 as the ordinary ray. The return laser beam is then refracted by the first surface 1a. A refractive index of the prism 1 made of optically anisotropic material for the incident laser beam slightly differs from that for the return laser beam, so that the return laser beam emanates from the first surface 1a of the prism 1 in a direction which is slightly different from the direction of the incident laser beam. In this manner, the return laser beam can be separated from the incident laser beam by the very small separation angle $\epsilon$.

Then, the return laser beam is made incident upon the photodetector 11 by means of the collimator lens 8. The photodetector 11 comprises a plurality of light receiving regions, and tracking error signal, focusing error signal and information signal may be derived by processing output signals of these light receiving regions. For instance, the tracking error signal may be obtained by a well known push-pull method.

The focusing error signal may be derived by the astigmatism method. In this astigmatism method, when the objective lens 9 is in a defocused position with respect to the optical record medium 10, the return laser beam becomes a diverging or converging beam, so that the focusing condition may be detected by utilizing the astigmatism produced on the first surface 1a of the prism 1. In this case, it is preferable that the direction of the astigmatism be set to be inclined by 45 degrees with respect to a direction in which an information track on the optical record medium 10 extends. It should be noted that the cross sectional shape of the return laser beam is changed by the first surface 1a in such a fashion that is opposite to that for the incident laser beam 4, and therefore the focusing error signal can be obtained at a high sensitivity.

When the optical record medium 10 is formed by an opto-magnetic record medium, the information signal may be detected by deriving a difference between output signals generated by light receiving regions which are aligned in the direction in which the information track extends. A principle of this method of deriving the information signal is known and is described in Japanese Patent Application Laid-open Publication Kokai Sho No. 63-187,442. When the optical record medium is formed by compact disk or phase change medium, the information may be obtained by deriving a sum of output signals of all light receiving regions.

In the optical head of the present embodiment, the semiconductor laser 7 and photodetector 11 can be arranged nearer to each other, so that the size of the optical head can be reduced.

Figure 5:
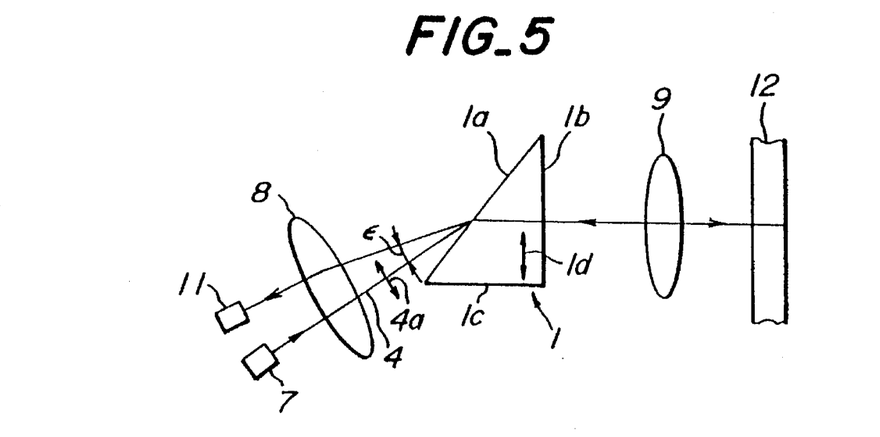
FIG. 5 is a schematic view illustrating a second embodiment of the optical head according to the invention.

FIG. 5 is a schematic view showing a second embodiment of the optical head according to the invention. In the present embodiment, the optical record medium is formed by an opto-magnetic record medium 12, and the quarter wavelength phase 2 provided in the first embodiment shown in FIG. 4 is deleted.

The diverging laser beam emitted by the semiconductor laser 7 is converted into the parallel incident laser beam by means of the collimator lens 8 and is then made incident upon the first surface 1a of the prism 1 at a given incident angle such that the elliptical cross sectional shape of the incident laser beam 4 is converted into the circular cross sectional shape. The incident laser beam 4 is linearly polarized in the direction 4a which is parallel with the plane of the drawing of FIG. 5. Within the prism 1, the incident laser beam propagates as the extraordinary ray and exits from the prism 1 via the second surface 1b perpendicularly thereto. The laser beam is then focused onto the opto-magnetic record medium 12 by means of the objective lens 9. The laser beam is then reflected by the record medium 12 as the return laser beam. The polarizing direction of the return laser beam is rotated by a Kerr rotation angle in a direction depending upon a direction of the magnetization in the opto-magnetic record medium 12. The return laser beam is then made incident upon the second surface 1b of the prism 1 by means of the objective lens 9. As stated above, the polarizing direction of the return laser beam has been rotated by the Kerr rotation angle in dependence upon the direction of the magnetization in the record medium 12, so that the return laser beam contains a polarizing component which is perpendicular to the plane of the drawing of FIG. 5. This polarizing component serves as the ordinary ray within the prism 1 and is refracted by the first surface 1a by an angle which is different from that of the incident laser beam 4. That is to say, the return laser beam can be separated from the incident laser beam by a small separation angle ε and is made incident upon the photodetector 11.

In the opto-magnetic record medium 12, the information is recorded as the direction of the magnetization, and at a transition at which the direction of the magnetization is reversed, the Kerr rotation angle is reduced apparently. Therefore, an amount of the polarizing component in the return laser beam which propagates within the prism as the ordinary ray is also reduced and thus the output signal of the photodetector 11 is also changed. In this manner, in the present embodiment, it is possible to detect an edge of a record mark on the information track. Therefore, the optical head of the present embodiment is particularly suitable for the opto-magnetic record medium of the mark length modulation system.

As explained above, in the present embodiment, although the optical head can be effectively used in combination with the opto-magnetic record medium, it can be made small in size. Contrary to this, the known optical head for use in combination with the opto-magnetic record medium is liable to be large in size and is complicated in construction.

Figure 6:
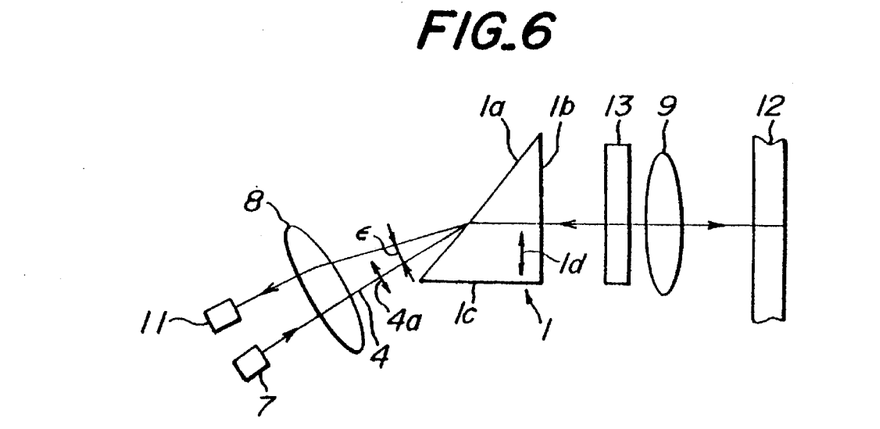
FIG. 6 is a schematic view showing a third embodiment of the optical head according to the invention.

FIG. 6 is a schematic view illustrating a third embodiment of the optical head according to the invention. The optical head of the present embodiment can be also used for the opto-magnetic record medium. In the present embodiment, a Faraday rotator 13 is arranged between the prism 1 and the objective lens 9. The remaining construction of the optical head is similar to the embodiment shown in FIG. 5. The laser beam passes through the Faraday rotator 13 twice, so that the polarizing direction of the laser beam is rotated by 45 degrees.

The incident laser beam 4 propagates within the prism 1 as the extraordinary ray and is made incident upon the opto-magnetic record medium 12 by means of the Faraday rotator 13 and objective lens 9. Then the laser beam is reflected by the record medium 12 and is returned to the prism 1 by means of the objective lens 9 and Faraday rotator 13. The polarizing direction of the return laser beam is changed between 45°±θ depending on the direction of the magnetization of the mark in the information track on the opto-magnetic record medium 12, where θ is the Kerr rotation angle. As stated above, the refraction index of the prism 1 for the ordinary ray is different from that for the extraordinary ray, so that an ordinary light component of the return laser beam is refracted by the first surface 1a in a direction which differs from the incident direction by a small separation angle ε. An amount of the ordinary light component in the return laser beam varies in accordance with the polarizing directions 45°+θ and 45°−θ, and thus the output signal of the photodetector 11 changes in accordance with the direction of the magnetization of the mark in the information track on the opto-magnetic record medium 12. In this manner, a position of the mark in the record track on the opto-magnetic record medium 12 can be detected. Therefore, the optical head of the present embodiment can be preferably used for the opto-magnetic record medium of the mark position modulation system and can provide a small optical head for the opto-magnetic record medium.

Figure 7:
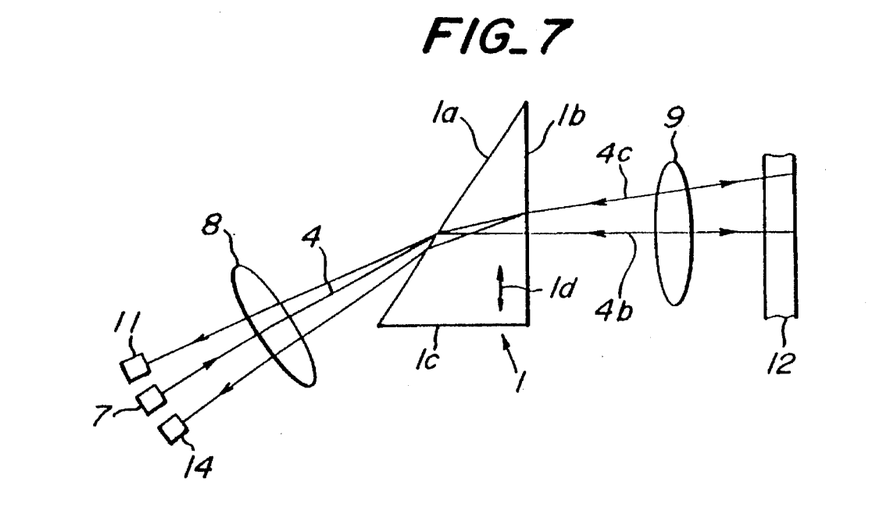
FIG. 7 is a schematic view depicting a fourth embodiment of the optical head according to the invention.

FIG. 7 is a schematic view illustrating a fourth embodiment of the optical head according to the invention which is used for the opto-magnetic record medium. In the present embodiment, the incident laser beam is made incident upon the first surface 1a of the prism 1 in such a manner that its polarizing direction is neither parallel with nor perpendicular to the plane of the drawing of FIG. 7.

When the incident laser beam 4 emitted by the semiconductor laser 7 is made incident upon the first surface 1a of the prism 1 made of the uniaxial crystal by means of the collimator lens 8, the incident laser beam is divided into extraordinary light beam 4b and ordinary light beam 4c. These light beams 4b and 4c emanate from the second surface 1b of the prism 1 in slightly different directions.

The extraordinary light beam 4b is projected onto the opto-magnetic record medium 12 by means of the objective lens 9 and is reflected by the record medium. This extraordinary laser beam is subjected to the Kerr rotation in accordance with the magnetizing direction, so that there is produced an ordinary light component. This ordinary light component is refracted by the first surface 1a in a direction which is slightly different from the incident direction. The ordinary light component is then received by the first photodetector 11 by means of the collimator lens 8.

The ordinary light beam 4c is also projected onto the opto-magnetic record medium 12 by means of the objective lens 9 at a point which is slightly shifted from a point at which the extraordinary light beam 4b is projected. When the ordinary light beam 4c is reflected by the opto-magnetic record medium 12, there is produced an extraordinary light component due to the Kerr rotation, and this extraordinary light component is first refracted by the second surface 1b and is then refracted by the first surface 1a. Therefore, the extraordinary light component emanates from the first surface 1a in a direction which is slightly different from the incident direction and also from the emanating direction of the ordinary light component. This ordinary light component is received by a second photodetector 14 by means of the collimator lens 8.

The optical head according to the present embodiment can provide the same merits as those obtained by the embodiment shown in FIG. 6. Furthermore, when the extraordinary light beam 4b and ordinary light beam 4c are projected onto two different information tracks on the opto-magnetic record medium 12, it is possible to detect edges of the marks in the two information tracks simultaneously, so that the reproduction can be performed at a higher speed. If there is arranged a Faraday rotator between the prism 1 and the objective lens 9, the position of the marks in the two different information tracks on the opto-magnetic record medium 12 may be detected simultaneously by means of the two laser beams. Moreover, when the extraordinary light beam 4b and ordinary light beam 4c are projected onto the opto-magnetic record medium 12 at points which are slightly shifted in the direction in which the information track extends, it is possible to record an information signal by using the extraordinary light beam 4b under the magnetic field modulation method, and at the same time a just recorded mark may be read out by using the ordinary light beam 4c. In this manner, the recorded information signal on the opto-magnetic record medium 12 may be verified.

The present invention is not limited to the embodiments explained above, but many modifications and alternations may be conceived by those skilled in the art within the scope of the invention. For instance, in the embodiment shown in FIG. 5, the optic axis 1d of the prism 1 may be set to be perpendicular to the plane of the drawing of FIG. 5. In this case, the return laser beam propagates within the prism as the extraordinary light.

Although the beam shaping and beam splitting device according to the invention may be advantageously utilized in the optical head, it may be used for any other applications in which the cross sectional shape of the incident light beam has to be corrected and the return light beam has to be separated from the incident light beam. For instance, the beam shaping and beam splitting device shown in FIGS. 2 and 3 may be used as an optical isolator for coupling a light beam with an optical fiber in which the light beam reflected by an end face of the optical fiber is effectively prevented from being returned to the optical fiber.

As explained above in detail, according to the present invention, the beam shaping and beam splitting device can be simply realized by the single prism made of optically anisotropic material and the return light beam can be separated from the incident light beam by the small separation angle, so that the device can be made small in size and simple in construction. Further, in the optical head according to the invention comprising the beam shaping and beam splitting device, the light source and photodetector can be arranged closer to each other, so that the whole optical head can be made small in size.

What is claimed is:

1. A beam shaping and splitting device for producing a polarized parallel incident light beam, converting said polarized parallel incident light beam into a corrected light beam having a corrected cross sectional shape, and emanating a return light beam which is obtained by reflecting said corrected light beam by a reflection surface, in a return direction which is different from an incident direction of said incident light beam, said beam shaping and splitting device comprising:

means for emitting said incident light beam in said incident direction; and a prism made of an anisotropic material and having (i) a first surface which is inclined with respect to said incident direction and upon which said incident light beam is made incident from said incident direction and (ii) a second surface from which the corrected light beam emanates from the prism in a direction which is different from said incident direction, said return light beam being refracted by said first surface and emanating from the first surface in said return direction.

2. A beam shaping and beam splitting device according to claim 1, further comprising an optical element for changing a polarized condition of the corrected light beam emanating from the second surface of the prism, the return light beam being made incident upon the second surface of the prism through said optical element.

3. A beam shaping and beam splitting device according to claim 2, wherein said optical element comprises a quarter wavelength plate.

4. A beam shaping and beam splitting device according to claim 2, wherein said optical element comprises a Faraday rotator.

5. A beam shaping and beam splitting device according to claim 1, wherein said prism is made of a uniaxial material.

6. A beam shaping and beam splitting device according to claim 5, wherein said uniaxial crystal is a, material.

7. A beam shaping and beam splitting device according to claim 1, wherein said incident light beam is linearly polarized, and wherein said prism is arranged such that an optic axis of said prism is in an incident plane of the linearly polarized incident light beam.

8. A beam shaping and beam splitting device according to claim 1, wherein said incident light beam is linearly polarized, and wherein said prism is arranged such that an optic axis of said prism is perpendicular to an incident plane of the linearly polarized incident light beam.

9. A beam shaping and beam splitting device for producing an elliptically polarized parallel incident light beam, converting said incident light beam into a corrected light beam having a corrected cross sectional shape, and emanating a return light beam which is obtained by reflecting said corrected light beam by a reflection surface, in a return direction which is different from an incident direction of said incident light beam, said beam shaping and splitting device comprising:

means for emitting said incident light beam in said incident direction; and a prism made of an anisotropic crystal having a natural rotatory polarization and having (i) a first surface which is inclined with respect to said incident direction and upon which said incident light beam is made incident from said incident direction and (ii) a second surface from which the corrected light beam emanates from the prism, said return light beam being refracted by said first surface and emanating from the first surface in said return direction, said prism being arranged such that an optic axis of the prism is parallel with a propagating direction of said corrected light beam within the prism.

10. A beam shaping and beam splitting device according to claim 1, wherein said incident light beam is linearly polarized, and wherein said prism is arranged such that an optic axis of said prism is neither parallel with nor perpendicular to an incident plane of the linearly polarized incident light beam such that two light beams are made incident upon the reflection surface and two return light beams emanate from said first surface of the prism in two different directions both of which differ from said incident direction.

11. An optical head for use in an optical information recording and/or reproducing apparatus, said optical head comprising:

a light source means for emitting a polarized light beam in an incident direction;

a prism made of an anisotropic material and having a first surface upon which said polarized light beam emitted by said light source means is made incident and which is oriented with respect to said incident direction so that a cross sectional shape of the polarized light beam is corrected to produce a corrected light beam having a corrected cross sectional shape, and a second surface from which said corrected light beam having the corrected cross sectional shape emanates;

an objective lens for projecting said corrected light beam emanating from said second surface of the prism onto an optical record medium and making a return light beam reflected by said optical record medium incident upon said second surface of the prism; and a photodetector for receiving said return light beam after said return light beam has been refracted by said first surface of the prism into a direction which is different from said incident direction.

12. An optical head according to claim 11, further comprising an optical element for changing a polarized condition of the corrected light beam emanating from the second surface of the prism, the return light beam being made incident upon the second surface of the prism through said optical element.

13. An optical head according to claim 12, wherein said optical element comprises a quarter wavelength plate arranged between the prism and the objective lens.

14. An optical head according to claim 12, wherein said optical element comprises a Faraday rotator arranged between the prism and the objective lens.

15. An optical head according to claim 11, wherein said prism is made of a uniaxial crystal.

16. An optical head according to claim 11, wherein said anisotropic material is made of a rock crystal.

17. An optical head according to claim 11, wherein said polarized light beam is a linearly polarized parallel laser beam, and wherein said light source means comprises a semiconductor laser for emitting a linearly polarized diverging laser beam having an elliptical cross sectional shape and a collimator lens for converting said linearly polarized diverging laser beam into said linearly polarized parallel laser beam, and said corrected cross sectional shape is a circular cross sectional shape.

18. An optical head according to claim 17, wherein said prism is arranged such that an optic axis of said prism is in an incident plane of the linearly polarized parallel laser beam.

19. An optical head according to claim 17, wherein said prism is arranged such that an optic axis of said prism is perpendicular to an incident plane of the linearly polarized parallel laser beam.

20. An optical head for use in an optical information recording and/or reproducing apparatus, said optical head comprising:

a light source means for emitting an elliptically polarized light beam in an incident direction;

a prism made of an anisotropic crystal having a natural rotatory polarization and having a first surface upon which said elliptically polarized light beam emitted by said light source means is made incident and which is oriented with respect to said incident direction so that a cross sectional shape of the elliptically polarized light beam is corrected to produce a corrected light beam having a corrected cross sectional shape, and a second surface from which said corrected light beam having the corrected cross sectional shape emanates, said prism being arranged such that an optic axis of the prism is parallel with a propagating direction of said corrected light beam within the prism;

an objective lens for projecting said corrected light beam emanating from said second surface of the prism onto an optical record medium and making a return light beam reflected by said optical record medium incident upon said second surface of the prism; and a photodetector for receiving said return light beam after said return light beam has been refracted by said first surface of the prism into a direction which is different from said incident direction.

21. An optical head according to claim 11, wherein said polarized light beam is a linearly polarized incident light beam, and wherein said prism is arranged such that an optic axis of said prism is neither parallel with nor perpendicular to an incident plane of the linearly polarized incident light beam so that two light beams are made incident upon the reflection surface by means of said objective lens and so that two return light beams emanate from said first surface of the prism in two different directions both of which differ from said incident direction.

22. A beam shaping and beam splitting device according to claim 9, wherein said anisotropic crystal comprises quartz.

23. An optical head according to claim 20, wherein said anisotropic crystal comprises quartz.

24. A beam shaping and beam splitting device according to claim 9, wherein said corrected light beam is circularly polarized.

25. An optical head according to claim 20, wherein said corrected light beam is circularly polarized.

26. An optical head according to claim 1, wherein the direction in which the corrected light beam emanates from the prism is perpendicular to said second surface.

27. An optical head according to claim 11, wherein the direction in which the corrected light beam emanates from the prism is perpendicular to said second surface.

* * * * *